United States Patent [19]

Nordberg

[11] 3,977,718
[45] Aug. 31, 1976

[54] TURNABLE TRUCK GATE

[76] Inventor: Carl-Eric Bertil Nordberg, Satunavagen 24 D, S-195 00 Marsta, Sweden

[22] Filed: Jan. 15, 1975

[21] Appl. No.: 541,291

[30] Foreign Application Priority Data
Jan. 17, 1974  Sweden ............................ 7400636

[52] U.S. Cl. .............................. 296/57 R; 49/340; 298/23 MD
[51] Int. Cl.² ........................................ B62D 33/02
[58] Field of Search .................. 296/56, 57 R, 57 A; 214/77 P; 298/23 MD; 105/286, 299; 49/339, 340, 344

[56] References Cited
UNITED STATES PATENTS

| | | | |
|---|---|---|---|
| 1,494,682 | 5/1924 | Gibbs | 49/340 |
| 1,955,167 | 4/1934 | Barrett | 298/23 MD |
| 2,261,099 | 10/1941 | Fairbanks | 296/57 A |
| 2,303,033 | 11/1942 | Elliott | 49/340 |
| 2,551,239 | 5/1951 | Bond | 49/340 |
| 2,901,288 | 8/1959 | Gilpatrick | 105/299 |

Primary Examiner—L. J. Paperner
Assistant Examiner—Winston H. Douglas
Attorney, Agent, or Firm—Flynn & Frishauf

[57] ABSTRACT

A turnable, generally box-girder-shaped gate for a truck platform with an operating device intended for actuation of the gate, comprising a drive device and a link coupling which is connected between the gate and the drive device for locking the gate in a non-activated state of the drive device. The link coupling includes a first link articulately connected to the gate and to a second link, the other end of the second link being fixedly connected to a stationary, but turnable, shaft. The shaft is connected via a third link to the drive device. In the locked position of the gate, the fulcrum of the first link with the second link lies along a substantially straight line which runs between the center of the shaft and the fulcrum between the first link and the gate in the non-activated state of the drive device. The fulcrum of the first link with the second link is arranged to be moved upwards by the drive device during unlocking of the gate.

12 Claims, 3 Drawing Figures

TURNABLE TRUCK GATE

This invention relates to a turnable, principally box-girder-shaped gate for a truck platform with an operating device intended for actuation of the gate.

Turnable truck gates are previously known and have formerly been swing-mounted at two or more points under the vehicle platform. The truck gates have been locked in the swung-up position by means of different coupling means. In recent times, certain forms of automatically openable tail gates have also emerged. All these types of truck gates suffer from the disadvantage that they are stiff or impossible to open when a load is exerted on the gates.

Further, the need has arisen for platforms which can temporarily be enlarged, due among other things to the desire to be able to deposit the load carried on the platform at a distance from the platform so as to facilitate vehicle movement when the load has been removed from the platform.

In all types of truck gates it is also of decisive importance for the gates to be lockable in the intended position without there being any risk of the gates being openable unintentionally. This applies particularly to automatically closable truck gates.

The object of the present invention is to solve the abovementioned problem of the prior art truck gates.

SUMMARY OF THE INVENTION

In accordance with the present invention, a turnable gate for a truck platform with an operating device intended for actuation of the gate comprises a drive device and a link coupling which is connected between the gate and the drive device and which is arranged to lock the gate in a non-activated state of the drive device. The gate is pivotally connected to the bed or other fixed portion of the truck. A first link of the link coupling is articulately connected between the gate and a second link, the other end of the second link being fixedly connected to a stationary but turnable shaft. A third link is articulately connected to the drive device and is fixedly connected to the stationary but turnable shaft 7. The fulcrum of the first link with the second link in the locked position of the gate lies along a substantially straight line which runs between the center of the shaft and the fulcrum between the first link and the gate in the non-activated state of the drive device. The fulcrum of the first link with the second link is arranged to be moved upwards by the drive device during unlocking of the gate under the influence of the rotation of the shaft imparted by the third link.

DETAILED DESCRIPTION OF ILLUSTRATED EMBODIMENTS

Figure 1:
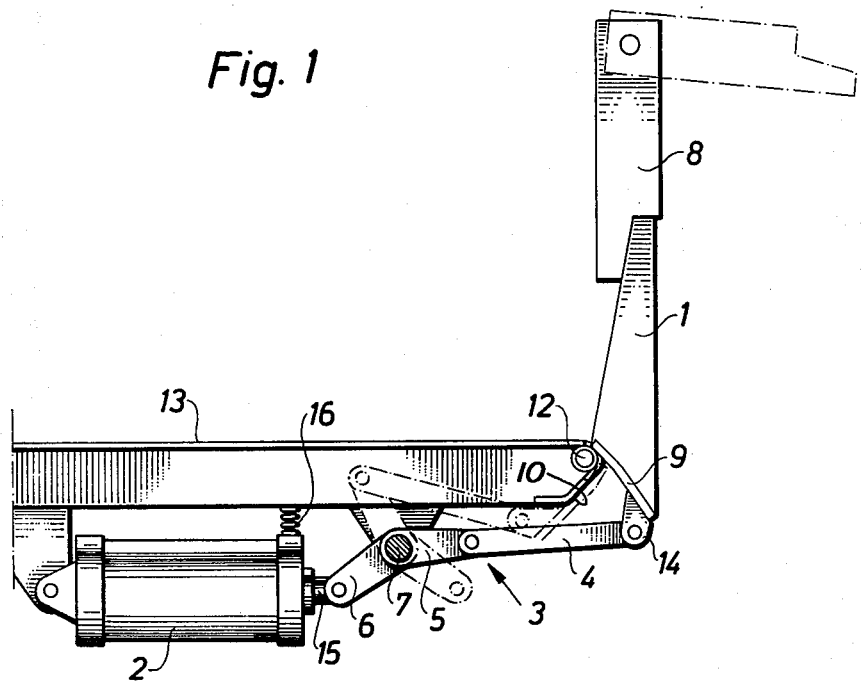
FIG. 1 shows a truck gate with appurtenant operating device viewed in cross section.
Figure 3:
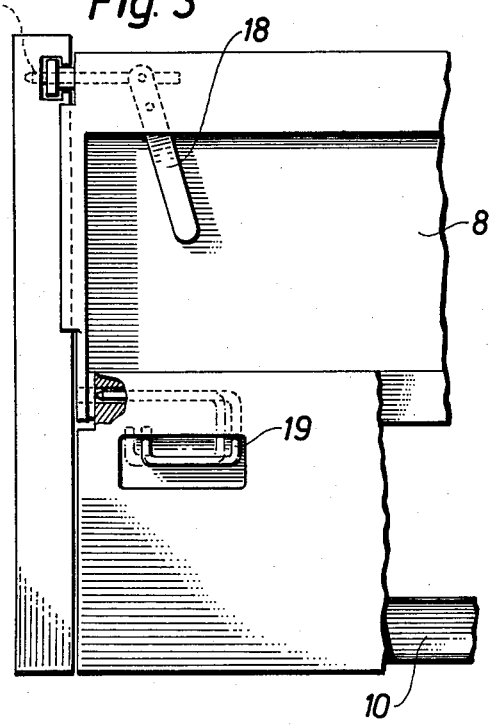
FIG. 3 shows a part of the truck gate according to FIG. 2, viewed from the outside.
Figure 2:
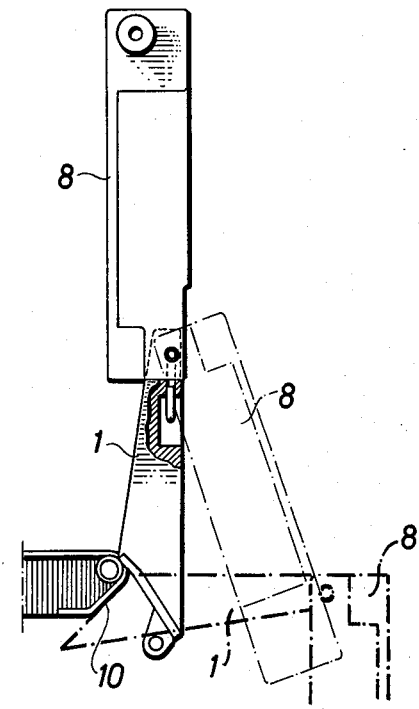
FIG. 2 shows a variant of the truck gate according to FIG. 1.

The truck gate shown in FIG. 1 comprises a lower gate 1 and an upper gate 8, which is pivot-mounted at its upper edge. Alternatively, the upper gate 8 can be pivotably attached to the lower gate 1 and at its upper edge, as shown in FIGS. 2 and 3. The lower gate 1 according to FIG. 1 is so devised that it locks the upper gate 8 when the latter is in a vertical position. The lower gate 1 is made in the form of a box girder (not shown), the cross-sectional profile of which is indicated in FIG. 1, and its inner surface, which faces towards the platform, is inclined approximately 10° in relation to the vertical plane, viewed in the turned-up position of the lower gate. The lower gate 1 is also furnished with an obliquely downward extending side 9, which in the turned-down position of the lower gate 1 interacts with a similarly obliquely downward directed supporting surface 10 provided on the load platform. The lower gate 1 swings around a pivot axle 12 which runs along the edge of the platform 13 and at relative distances attachment means 14 are placed along the lower gate 1. The attachment means 14 are connected via fulcrums to a first link 4 in a link coupling which also comprises a second link 5 articulately connected to the first link 4, the other end of the link 5 being fixedly attached to a shaft 7, which is arranged pivotably and is placed parallel with the pivot axle 12 for the lower gate 1. Also fixedly connected to the shaft 7 is a third link 6 which is articulately connected with the moving piston 15 of a hydraulic or pneumatic drive 2 and which preferably is set at an angle in relation to the second link 5. The hydraulic drive 2 is articulately suspended at one end and at the other end articulately connected to link 6. A spring 16 ensures counterbalancing of the weight of the drive 2.

In the position shown in FIG. 1 the lower gate 1 is in the turned-up position and thus locks the upper gate 8 also. Loads exerted on the inside of the lower gate 1, i.e. the side facing in towards the platform 13, give a torque which is absorbed by the straight load line from the attachment means 14 via the fulcrum between the first link 4 and the second link 5 to the shaft 7, when the drive 2 is in a nonactuated state. The lower gate 1 is thus locked.

When the lower gate 1 is to be turned down, the piston 15 of the hydraulic drive 2 is actuated, appropriately from the cab of the vehicle by means of a not shown actuating device, so that it moves to the right according to FIG. 1. The piston 15 thus performs a swing motion, which is indicated by a broken line in FIG. 1, the same motion thus also being performed by the third link 6, which turns the shaft 7 a corresponding amount. A pluraliy of such second links 5 is turned by the shaft 7 to the same extent and thus a number of attachment means 14 on the lower gate 1 are moved synchronously relative to each other, whereby the lower gate 1 is dropped to the position indicated by broken lines in FIG. 1. In this latter position the link coupling will be relieved, since in this position one side 9 of the gate rests against the supporting surface 10 on the platform 13. The load subsequently exerted on the lower gate 1 is thus absorbed by the pivot axle 12 and the supporting surface 10.

The lower gate 1 consequently forms an enlargement of the surface of the platform 13 in the turned-down or dropped position. In dumping of a load carried on the platform 13 the load will thus fall down further away from the truck compared with an ordinary truck gate which is merely let down or opened. Conversely, the lower gate 1 can also be utilized to push in any protruding load towards the centre of the platform 13 during the raising of the lower gate 1.

The truck gate according to the invention can obviously be used without an upper gate and different types of upper gates can be utilized, only two of which have been indicated as examples in FIGS. 1 and 2.

The different positions of the gates are also indicated preferably by means of signal lamps in the driver's cab.

The variant illustrated by FIGS. 2 and 3 similarly comprises an upper gate 8 which, however, is pivotably mounted at both the upper and lower edge, and a lower gate 1. The upper edges of the upper gate is normally locked by means of two pins 17, which by means of two levers 18 can be brought out of engagement, whereby the upper gate 8 can swingaround its lower edge if two coupling pins 19 are brought to the position indicated by broken lines in FIG. 3. Under these conditions the upper gate 8 becomes suspended only to the lower gate 1 and can occupy the two positions indicated by broken lines in FIG. 2 depending on whether or not the lower gate 1 is turned down.

I claim:

1. A turnable gate arrangement for a truck platform (13), comprising:
   a gate (1) pivotally mounted along an edge portion thereof relative to the truck platform (13) and pivotable between at least a closed locked position and an open unlocked position, the portion of the gate remote from said edge portion being higher in the closed locked position than in the open unlocked position;
   drive means (2);
   a link coupling (3) operably coupling the gate (1) to the drive means (2) and which is arranged to lock the gate (1) in the non-activated state of the drive means (2), the link coupling (3) including first, second and third links (4,5,6, respectively), and a stationary but turnable shaft (7), the first link (4) of the link coupling (3) being articulately connected to the gate (1) at a first fulcrum and articulately connected to one end of the second link (5) at a second fulcrum, the other end of the second link (5) being fixedly connected to the shaft (7), the second link (5) being movable by rotation of the shaft (7), the third link (6) being fixedly connected to the shaft (7) and being further connected to the drive means (2), the drive means (2) when actuated moving the third link (6) to impart rotation to the shaft (7) to cause the gate (1) to turn to an unlocked position via the first (4) and second (5) links;
   said second fulcrum, in the locked position of the gate (1) and in the non-activated state of the drive means (2), lying along a substantially straight line passing between the center of the shaft (7) and said first fulcrum to maintain the locked position of the gate (1); and
   said second fulcrum being movable upwards upon actuation of the drive means (2) to unlock the gate (1), under the influence of rotation of the shaft (7) via the drive means (2) and third link (6).

2. A gate arrangement according to claim 1 wherein said gate (1) is a generally box-girder-shaped gate.

3. A gate arrangement according to claim 1 wherein said gate (1) in its locked position is substantially vertically oriented, the gate (1) being pivotable relative to the truck platform (13) to a lowered, substantially horizontal position.

4. A gate arrangement according to claim 1 wherein the gate (1) is in its locked position, substantially vertically oriented, the surface of the gate (1) facing towards the truck platform (13), in the raised position of the gate, forming an angle of approximately 10° to the vertical plane.

5. A gate arrangement according to claim 1 wherein the gate (1) comprises the lower gate of a truck platform and is pivotally mounted relative to the truck platform at a lower portion of the gate.

6. A gate arrangement according to claim 5 wherein the lower portion of the gate (1) is pivotally mounted to the truck platform (13).

7. A gate arrangement according to claim 1, wherein the gate (1) comprises the lower gate of the truck platform, and further comprising an upper gate (8) mounted to the truck, the upper gate including means engagable by the lower gate so as to retain the upper gate in a fixed position relative to the platform (13) when the lower gate (1) is in its locked position.

8. A gate arrangement according to claim 7 wherein the upper gate (8) is pivotally mounted of at least one of its upper and lower edges relative to the truck platform (13).

9. A gate arrangement according to claim 1, wherein the truck platform (13) includes a supporting surface (10), and wherein the gate (1) has a surface (9) engagable with the supporting surface (10) when the gate (1) is in an unlocked, lowered position, thereby relieving the link coupling (3).

10. A gate arrangement according to claim 1, wherein the shaft (7) is fixedly but turnably mounted to the truck platform (13).

11. A gate arrangement according to claim 10 wherein the drive means (2) includes a piston-cylinder drive mechanism which is articulately coupled to the third link and which is pivotally connected relative to the truck platform (13).

12. A gate arrangement according to claim 11 wherein the cylinder is pivotally connected at one end relative to the truck platform (13), and is spring-mounted at the other end relative to the truck platform (13), the piston being articulately connected to the third link (6).

* * * * *